United States Patent [19]
Olson et al.

[11] 3,767,531
[45] Oct. 23, 1973

[54] PREPARATION OF INSOLUBILIZED ENZYMES

[75] Inventors: Alfred C. Olson, El Cerrito; William L. Stanley, Richmond, both of Calif.

[73] Assignee: The United States of America as represented by the Secretary of Agriculture, Washington, D.C.

[22] Filed: Feb. 14, 1972

[21] Appl. No.: 226,283

[52] U.S. Cl............................ 195/63, 99/48, 99/57, 99/106, 195/31 R, 195/68, 195/DIG. 11
[51] Int. Cl............................................. C07g 7/02
[58] Field of Search................. 195/63, 68, DIG. 11; 260/838

[56] References Cited
UNITED STATES PATENTS
3,705,084   12/1972   Reynolds .............................. 195/68

OTHER PUBLICATIONS

Habeeb, A.F.S.A., Preparation of Enzymically Active, Water–Insoluble Derivatives of Trypsin. Archives of Biochemistry and Biophysics, 119, 1967 (PP. 264–268) QD 501A77.

*Primary Examiner*—David M. Naff
*Attorney*—R. Hoffman et al.

[57] ABSTRACT

Insolubilized but active enzymes are prepared by reacting an enzyme with a phenol-formaldehyde resin and glutaraldehyde.

7 Claims, No Drawings

PREPARATION OF INSOLUBILIZED ENZYMES

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel water-insoluble but active enzyme products and methods for preparing them. Further objects of the invention will be evident from the following description wherein parts and percentages are by weight unless otherwise specified.

In recent years there has been considerable interest in preparing enzymes in insolubilized (sometimes referred to as immobilized) form. Such products enable enzyme-catalyzed reactions to be carried out in a simplified and efficient manner. Typically, the insolubilized enzyme is placed in a cylindrical vessel and a solution of the substrate to be reacted is passed through the enzyme column. The reaction takes place within the column and the effluent liquor contains the reaction products. With this system the enzyme can be used repeatedly for processing fresh batches of the substrate. Various techniques have been advocated for preparing insolubilized enzymes. One procedure is to entrap the enzyme in polymerizing polyacrylamide; another is to adsorb it on insoluble media such as ion exchange resins, alumina, etc.

In accordance with the invention, insolubilized but active enzymes are prepared from enzymes which are in a normal or native (soluble) state by reacting them with a phenol-formaldehyde resin and glutaraldehyde. The reaction is generally conducted in an aqueous medium, and preferably the resin and glutaraldehyde are sequentially reacted with the starting enzyme.

For the sake of brevity, the insolubilized (immobilized) enzyme products of the invention are referred to by the term "enzyme-RG," and specifically as "lactase-RG," "amylase-RG," and the like.

It should be noted that both the phenol-formaldehyde resin and the glutaraldehyde are essential to form the products of the invention. If the resin alone is used, the enzyme easily washes away, and the activity is lost. Moreover, if glutaraldehyde alone is used, great difficulty is encountered in forming an insolubilized product, particularly from a crude starting material. In sum, it is necessary to employ both the resin and glutaraldehyde, whereby to readily attain products which are stable to repeated use, that is, which retain their activity even when used over and over again.

The invention provides many important advantages, typical examples of which are outlined below.

A primary advantage of the products of the invention is that their activity does not materially decrease during use. For instance, a particular product of the invention (lactase-RG) was used continuously for over 6 weeks with no loss of activity under conditions wherein the ratio of substrate to enzyme reaction product was greater than 100,000 to 1. Thus, the products of the invention have the advantage not only of being reusable, but also usable under conditions of continuous operation for long periods of time and with large amounts of substrates.

Another advantage of the invention is that the phenolformaldehyde resin not only contributes to insolubilization of the enzyme applied thereto, but also provides useful physical properties to the product. In particular, the resin acts as a support or carrier so that the insolubilized enzyme product forms a column through which water and other liquids can percolate readily. This is in sharp contrast to known insolubilized enzymes which are generally amorphous materials that cannot be used directly in a column because liquids will not flow therethrough. These known products require the addition of a carrier such as diatomaceous earth, crushed firebrick, or the like to provide a liquid-permeable mass.

Another advantage of the invention is that the products are afforded by simple procedures using readily-available reactants. No exotic chemicals or complicated procedures are required. Nonetheless, the products retain a significant and sufficient part of the activity of the starting enzyme. In some cases, the major part of the original activity is retained.

A further advantage of the invention is that useful products can be prepared from any enzyme source, including pure enzymes, enzyme concentrates, crude enzyme preparations, and even such substances as animal organs, plant parts, microbial cultures, and the like. Important in this regard is that application of the herein-described reactants causes most of the active enzyme to be selectively precipitated even where it is present in minute quantity, e.g., as little as 1 mg. of active enzyme in association with gram quantities of inactive components. Accordingly, the invention provides the means for preparing insolubilized products from enzymes which previously were difficult to insolubilize or which were never insolubilized.

Another advantage of the invention lies in the precise control that one can exercise over the extent and direction of enzymic reactions. This results because of the solid nature of the products of the invention which allows specific amounts to be metered out to suit any particular situation.

Another advantage of the invention is that enzymic reactions can be stopped at any desired time by simply separating the solution under treatment from the insolubilized enzyme—for example, by draining the solution away from the reaction system. Thus, no external forces—such as heat, acid, and the like which might be detrimental—need be applied to short-stop the reaction.

DETAILED DESCRIPTION OF THE INVENTION

Preparation of the products of the invention involves reaction of the starting enzyme with the phenol-formaldehyde resin and glutaraldehyde. In a preferred embodiment of the invention, the starting enzyme is first adsorbed on the resin and the resin-enzyme complex is then treated with glutaraldehyde. Alternatively, the resin may be first treated with glutaraldehyde and then with the enzyme. Water is advantageously used as the reaction medium. Temperatures employed are generally ambient (room) temperature, or somewhat lower or higher, i.e., the range about from 1° to 40° C. Conventional operations such as mild stirring or shaking are applied to attain good contact between reactants. The products are segregated by the usual mechanical procedures such as filtration, centrifugation, or decanting. For best results, the aqueous medium is adjusted to the pH at which the enzyme in question is soluble.

In another embodiment of the invention, the resin is first treated with a non-enzymatic protein (such as bovine serum albumin, soybean protein, egg albumin, or the like), then treated with glutaraldehyde, and finally with the enzyme to be insolubilized, whereby to yield a high specific activity product.

The phenol-formaldehyde resins used in accordance with the invention are commercially-available resins produced by the condensation polymerization of phenol, or a substituted phenol, with formaldehyde under acidic or basic conditions. The resin prepared from phenol and formaldehyde has been shown to contain repeating units of the structure

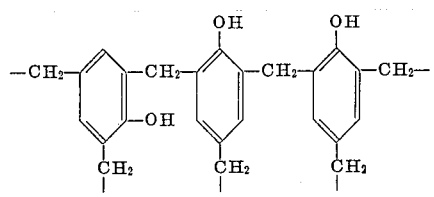

Resins of this type are available on the market under such names as Bakelite and Duolite. Other phenols which may be employed in preparing the resins are listed below by way of illustration and not limitation: Catechol, resorcinol, hydroquinone, o-, m-, and p-cresol, p-hydroxybenzoic acid, salicylic acid, o-, m-, and p-chlorophenol, o-, m-, and p-aminophenol, o-, m-, and p-phenolsulfonic acid, and the like.

For use in the process of the invention, the phenol-formaldehyde resin should be in granular or bead form. If the resin is in large pieces, grinding is applied to reduce it to granular form. It is also desirable to apply a sieving operation to remove fine particles and over-size particles retaining those having a mesh size in the range about from 10 to 40 mesh.

Also prior to use it is preferred to treat the resin to remove impurities. Washing the resin with water is useful for the purpose. A preferred plan involves first washing the resin with distilled water, then soaking it overnight in dilute (about 0.1 M) aqueous NaCl solution, followed by re-washing in distilled water to remove all traces of salt.

Preferred procedures used in a practice of the invention are described below.

The enzyme to be insolubilized is dissolved in distilled water. Where necessary, the pH of the water is adjusted by conventional methods to a level at which the enzyme is soluble. Appropriate pH's to use with any particular enzyme are described in the literature. In many cases a pH of about 3 to 7 is employed. It may further be noted that oftentimes the starting material already contains a buffer or other pH-adjusting agent so that when it is mixed with water the resulting dispersion will exhibit a pH at which the enzyme is most soluble. This is particularly the case with commercially-available enzyme preparations. It is obvious that in such cases there is no need to apply any pH adjustment.

Following preparation of the aqueous solution of the starting material, a mechanical separation step such as filtration or decantation can be applied to remove fillers, debris, or other undissolved material.

Next, the aqueous dispersion of the starting enzyme is added to the resin granules. Generally, about 20 to 100 parts of resin per part of enzyme are used. The mixture is gently agitated by conventional means such as shaking, stirring, or the like while being held for about 1/4 to 5 hours at a temperature of about 1° to 25° C. in order to cause the enzyme to be adsorbed on the resin.

Having adsorbed the enzyme on the resin, an aqueous solution of glutaraldehyde is added to the above suspension. The amount of glutaraldehyde is not critical. Usually, a large excess, e.g., 10–50 parts thereof per part of enzyme, is used; the unreacted residue is removed in a subsequent washing step.

The resulting mixture is held for a period of time to ensure formation of the enzyme-RG product. Usually, the holding is for a period of about 12–24 hours in a cold room at about 1°–10° C. However, a somewhat shorter holding period can be realized if the holding is conducted at temperatures between 10°–25° C. The product is then collected by filtration and rinsed several times with distilled water to remove excess reagents and other impurities. The so-prepared enzyme-RG is then ready for use.

In an alternative embodiment of the invention the following procedure is used. The resin granules, after sieving and removal of impurities, are packed into a column to which is then added an aqueous solution of the enzyme at the proper pH. A temperature in the range of 1°–25° C. is appropriate. It should be obvious that the column must be cooled in order to conduct the reaction at temperatures below room temperature. Such cooling can be accomplished by conventional means, such as cold room, jacketed column, and so forth. Good contact between the resin particles and the enzyme is afforded by recirculating the solution through the column. Generally, the flow of solution through the column is contained for a period of about 1/4 to 5 hours; again, the higher the temperature, the shorter the time of contact required.

Following the adsorption of the enzyme by the resin, an aqueous solution of glutaraldehyde, in an amount sufficient to fix the enzyme to the resin, is pumped slowly onto the column. Prior to the addition of the glutaraldehyde, it may be desired to remove excess enzymic material by passing a small quantity of distilled water through the column. The flow rate of the glutaraldehyde solution should be such that the materials are contacted with resin for 12–24 hours at a temperature from 1° to 25° C. Alternately, the glutaraldehyde solution can be applied rapidly, and the column contents held for 12–24 hours. Afterwards, the column is flushed with distilled water to remove excess reagents and impurities, and any excess liquid is allowed to drain from the column. Thus prepared, the column is ready for use.

The products of the invention can be utilized in a variety of ways. A few examples are provided below by way of illustration and not limitation.

One particular application of the invention concerns the disposition of whey, the watery part of milk left over from cheese manufacture. Currently, whey is discarded into rivers, lakes, and other bodies of water with detrimental effects on the environment. The biological oxygen demand (referred to in the art as B.O.D.) of the water is raised, thus producing an imbalance in nature. As corrective legislation is enacted, companies will be forced to pay a high price for disposal of whey by other means.

Protein can be separated from whey, leaving a material composed essentially of lactose. Although the protein is beneficial as a food supplement, the lactose cannot be utilized. Thus, recovery of protein from whey is uneconomical. However, as a result of the invention lactose can be efficiently converted into galactose and glucose. These sugars are useful as fermentation media, e.g., in the culturing of yeast. The combined monetary rewards for the protein and the hydrolyzed lactose would, therefore, make it advantageous for the cheese producer to retain the whey. Of course, this economical advantage must be considered with respect to the price the manufacturer would have to pay for disposal of the whey.

The following example describes the application of the invention to the aforementioned problem. First lactase-RG is prepared by the method described herein. Then, the protein is removed from the whey by conventional means, for instance, pre-treating the whey with the phenolic resin itself. The de-proteinized whey is pumped through a column containing the lactose-RG and then rinsed several times with distilled water. The immobilized enzyme product exhibited 60% of the activity of the original enzyme.

Example 2

Lactase-RG Hydrolysis of Lactose

Lactase-RG prepared as described in Example 1 was packed into a 1.2 cm × 15 cm. jacketed column over a bed of sand. The column was then washed several times with pH 4.5 (0.02 M) phosphate buffer.

An aqueous lactose solution (3.0% in 0.02 M phosphate buffer) was then pumped through the column at varying flow rates. The column temperature was regulated by passing warm water through the column jacket. The extent of hydrolysis was determined by analyzing for glucose in the effluent.

The results are summarized below:

| Temperature, °C | 30 | | | | 45 | | | | 55 | | | |
|---|---|---|---|---|---|---|---|---|---|---|---|---|
| Flow, ml./min | 0.2 | 0.5 | 1 | 2 | 0.2 | 0.5 | 1 | 2 | 5 | 0.5 | 1 | 2 |
| Percent hydrolysis | 90 | 76 | 58 | 43 | 100 | 93 | 81 | 64 | 44 | 100 | 91 | 75 |

The resulting galactose and glucose are collected in the effluent and used as desired.

The invention can also be applied for the modification of protein in beer, wine, fruit juices, etc., so that they will not become turbid upon standing. In this particular embodiment of the invention, protease-RG is prepared and mixed with the liquid, e.g., beer. After a time sufficient to allow the enzyme to attack the proteinaceous material, the mixture is centrifuged. The result is a clarified liquid which will not become cloudy when held under refrigeration. Alternately, a column packed with protease-RG may be used, and the beer to be clarified can be pumped through said column.

Other applications include hydrolyzing starch to glucose, inverting sucrose solutions for the manufacture of candy, conversion of glucose to fructose, de-glucosing egg whites, conversion of dilute alcohol solutions to vinegar, and the like.

It is believed that formation of the products of the invention involves absorption of the enzyme molecules on the phenol-formaldehyde resin, the resulting complex being cross-linked by the glutaraldehyde. In this way, the enzyme becomes attached to a "rigid backbone." Said attachment can be between the amino, hydroxyl, or sulfhydryl groups of the enzyme and the hydroxyl and aldehyde portions of the resin and glutaraldehyde.

EXAMPLES

The invention is further demonstrated by the following illustrative examples.

Example 1

Preparation of Lactase-RG

The starting enzyme was a commercial product (Wallerstein lactase LP), the lactase content of which was estimated to be about 10%. The resin was a commercial phenol-formaldehyde resin (Duolite S-30).

The resin was sieved to obtain particles of 30–40 mesh. After washing the resin with distilled water, it was soaked overnight in 0.1 M (0.58%) sodium chloride and rewashed with distilled water. A solution of 228 mg. of the lactase preparation in 20 ml. of distilled water was added to 10 g. of wet, drained resin at 25° C. After stirring gently for 15 minutes, 3 ml. of a 25% aqueous glutaraldehyde solution was added. The reaction mixture was left in the cold (5° C.) for 16 hours

Example 3

Continuous Use of Lactase-RG Column

A column, identical to that described in Example 2, was prepared, and its activity measured, using a 3% lactose solution at pH 4.5 at a temperature of 45° C. and a flow rate of 2 ml./min.

The column was used for a period of 6 weeks, during which time the amount of lactose applied, the temperatures, and the flow rate were varied. During this period the ratio of the total amount of lactose hydrolyzed to the amount of enzyme on the column was in excess of 100,000 to 1.

At the end of 6 weeks the activity was again measured as above.

The results are summarized below:

| Time (weeks) | Hydrolysis (%) |
|---|---|
| 0 | 64 |
| 6 | 64 |

Example 4

Preparation of Invertase-RG

The starting enzyme was a commercial product (Sucrovert from the Numoline Division of Sucrest Corporation), the invertase content of which was estimated to be about 0.5–1.0%. The resin was a commercial phenol-formaldehyde resin (Duolite S-30).

The resin was sieved to obtain particles of 20–30 mesh. After washing the resin with distilled water, it was soaked overnight in 0.1 M (0.58%) aqueous sodium chloride and then rewashed with distilled water. An aqueous solution of 50 ml. of the invertase preparation was added to 20 g. of wet, drained resin at 25° C. The mixture was stirred gently for 15 minutes and then left at 5° C. overnight, after which 2 ml. of a 25% aqueous glutaraldehyde solution was added. The reaction mixture was left in the cold (5° C.) for 16 hours and then rinsed thoroughly with distilled water. The invertase-RG exhibited 9% of the activity of the original enzyme.

Example 5

Invertase-RG Hydrolysis of Sucrose

Invertase-RG prepared as described in Example 4 was packed into a 1.2 cm. × 15 cm. jacketed column over a bed of sand. The column was washed with water.

Aqueous sucrose solutions (10 and 30% in 0.02 N sodium acetate buffer, pH 4.5) were then fed through the column at varying flow rates. The column temperature was regulated at 37° C. by passing warm water through the column jacket. The extent of hydrolysis was determined by analyzing for glucose in the effluent.

The results are summarized below:

| Sucrose concentration in solution | 10% | | | | 30% | |
|---|---|---|---|---|---|---|
| Flow rate, ml./min. | 0.2 | 0.5 | 1.0 | 2.0 | 0.2 | 0.5 |
| % Hydrolysis | 100 | 100 | 100 | >95 | 100 | 90 |

Example 6

Preparation of Glucoamylase-RG

The starting enzyme was a commercially available glucoamylase solution (from A. E. Staley Mfg. Co., Decatur, Ill.) containing about 160 mg. protein/ml. (16%). Two ml. of this solution was diluted to 30 ml. with water and added to 30 g. wet, drained 20–30 mesh Duolite S-30 resin, which had been sieved, washed, treated with sodium chloride solution, and rewashed as described in the previous examples. The mixture was agitated gently at ambient temperature for 5 minutes and kept at 3° C. for 16 hours. Then, a solution of 3.2 ml. of a 25% solution of glutaraldehyde, diluted to 10 ml. with water, was added to the mixture with gentle agitation. (The final glutaraldehyde concentration in the mixture was 2%.) The mixture was kept at 3° C. overnight and then washed extensively with water. The washed glucoamylase-RG contained about 18 mg. protein/g. of dry weight resin and exhibited 8% of the activity of the soluble enzyme.

Example 7

Glucoamylase-RG Hydrolysis of Starch

Glucoamylase-RG prepared as described in Example 6 was packed into a 1.2 × 15 cm. jacketed column over a bed of sand. An aqueous 2% starch solution containing 0.01 M citrate buffer was fed through the column at 60 ml./hr. at a temperature of 30° C. Under these conditions approximately 35% of the starch was hydrolyzed to glucose.

Example 8

Preparation of Pepsin-RG

The starting enzyme was a purified preparation of pepsin (Sigma Chemical Co.). A solution of 319 mg. of the enzyme in 30 ml. of water was added to 30 g. of wet, drained 20–30 mesh Duolite S-30 (purified as described in previous examples) at ambient temperature with gentle agitation. The mixture was held at 3° C. for 16 hours, after which glutaraldehyde was added in an amount sufficient to provide a final glutaraldehyde concentration of 2%. This mixture was kept at 3° C. for 16 hours and then washed thoroughly with water. The so-prepared insoluble enzyme product exhibited about 0.1% of the activity of the soluble enzyme toward standard 2% hemoglobin solutions at pH 2.0 and 37° C. The so-prepared pepsin-RG was packed into a 1.2 × 15 cm. jacketed column over a bed of sand. An aqueous solution of 2% hemoglobin (pH 2.0) was fed through the column at 30 ml./hr. and 37° C. Under these conditions a significant portion of the hemoglobin was hydrolyzed.

Example 9

In Situ Preparation of a Lactase-RG Column

Duolite S-30 resin (20-30 mesh) was packed into a jacketed column over a bed of sand. A solution of lactase (Example 1) was allowed to pass through the column at a rate of about 30 ml./hr. at ambient temperature, followed by 30 ml. of a 2% aqueous glutaraldehyde solution. The column was rinsed thoroughly with distilled water until no excess reactants were detectable in the wash waters.

A 6.0% aqueous solution of lactose (0.02 M lactate buffer) was passed over the column at 50° C. and a rate of 1 ml./min. The lactose was more than 90% hydrolyzed to galactose and glucose.

Having thus described our invention, we claim:

1. A process for preparing an insoluble but active enzyme which comprises:
    a. dissolving a soluble enzyme in water,
    b. mixing the resulting solution with granules of solid phenol-formaldehyde resin to cause the enzyme to be adsorbed by the resin,
    c. contacting the resin containing adsorbed enzyme with an aqueous solution of glutaraldehyde, and
    d. separating the resulting enzyme-resin-glutaraldehyde reaction product.

2. An insoluble but active enzyme comprising a complex of a soluble enzyme and a phenol-formaldehyde resin, cross-linked with glutaraldehyde.

3. The product of claim 2 wherein the enzyme is a sugar-hydrolyzing enzyme.

4. The product of claim 2 wherein the enzyme is a glucose-oxidizing enzyme.

5. The product of claim 2 wherein the enzyme is a protein-degrading enzyme.

6. The product of claim 2 wherein the enzyme is a hydrogen peroxide-degrading enzyme.

7. The product of claim 2 wherein the enzyme is a starch-hydrolyzing enzyme.

* * * * *